United States Patent [19]

Reigler et al.

[11] 3,963,281
[45] June 15, 1976

[54] EXPANSION BEARING ASSEMBLY FOR A CONVERTER CARRYING TRUNNION

[75] Inventors: Ernst Riegler, Enns; Manfred Schmidt, Linz, both of Austria

[73] Assignee: Vereinigte Österreichische Eisen- und Stahlwerke-Alpine Montan Aktiengesellschaft, Linz, Austria

[22] Filed: Jan. 2, 1975

[21] Appl. No.: 538,203

[30] Foreign Application Priority Data
Jan. 10, 1974 Austria ................. 166/74

[52] U.S. Cl. .................. 308/6 R; 308/176
[51] Int. Cl.² ......................... F16C 17/00
[58] Field of Search .......... 308/6 R, 59, 72, 176, 308/187.1, 207, 245

[56] References Cited
UNITED STATES PATENTS

| | | | |
|---|---|---|---|
| 3,291,541 | 12/1966 | Dellinger | 308/6 R |
| 3,291,542 | 12/1966 | North | 308/176 X |
| 3,311,427 | 3/1967 | Toth et al. | 308/176 X |
| 3,350,144 | 10/1967 | Beckman et al. | 308/176 X |
| 3,490,251 | 1/1970 | Roethlisberger | 308/176 X |

*Primary Examiner*—M. H. Wood, Jr.
*Assistant Examiner*—Gene A. Church
*Attorney, Agent, or Firm*—Brumbaugh, Graves, Donohue & Raymond

[57] ABSTRACT

An expansion bearing assembly for a converter carrying trunnion, has an inner race secured in place on the carrying trunnion and an axially displaceable outer race. The outer race possesses flattened faces distributed over its periphery opposite recesses in the bearing housing. Rollers in the recesses roll against the flattened faces. A plurality of rollers are preferably united in roller cages in the recesses in the bearing housing.

11 Claims, 3 Drawing Figures

EXPANSION BEARING ASSEMBLY FOR A CONVERTER CARRYING TRUNNION

BACKGROUND OF THE INVENTION

This invention relates to an expansion bearing assembly for a converter carrying trunnion, for instance, a slide bearing, an articulation bearing, or a ball and roller bearing having an inner race secured in place on the carrying trunnion and a part axially displaceable on rollers within the bearing housing.

In the fields of general engineering, or gear making it is customary to mount a shaft in a fixed bearing on one side and in an expansion bearing on the other side, so that it can accommodate thermal expansion, or assembly deficiencies and in order to guarantee smooth operation.

In a converter plant, too, the converter carrying ring is usually mounted with one carrying trunnion in a fixed bearing and the other carrying trunnion in an expansion bearing. There are different known embodiments for the expansion bearing construction. The construction according to U.S. Pat. No. 3,291,541, for instance, has the outer race inserted in a saddle-like part which, together with the bearing, forms a sledge which is movable on rollers on two paths on the lower side of the saddle. This construction has the disadvantage, however, that it is expensive and, due to the relatively large distance between the paths and the carrying trunnion axis, which is the point of impact for axial forces caused by thermal expansion, a tilting moment results which threatens the stability of the bearing.

SUMMARY OF THE INVENTION

It is the object of the invention to eliminate these disadvantages and difficulties and to enable an axial displacement of the outer race with rolling friction, and to avoid the occurrence of tilting moments or to minimize their risk. This object is achieved in a bearing of the above defined kind in that the outer race possesses flattened faces distributed over its periphery, which faces lie opposite respective recesses in the bearing housing that have rollers arranged in them which run on the flattened faces.

Advantageously, the flattened faces are arranged over the periphery of the race at distances of 90° each. Thus it is possible to turn the outer race after a certain period of time, for instance, after 2 to 3 years, so that the zone previously not under load now becomes the zone under load.

According to a further embodiment of the invention a sliding plate of synthetic material or bronze, adjustable by means of a threaded spindle or the like, is provided at the uppermost point of the outer race of the bearing for accommodating transversal forces.

The rollers may be cylindrical or slightly crowned. It is advantageous to unite a few of such rollers in a roller cage with each roller having a bore and being rotatably arranged on pins with some clearance.

BRIEF DESCRIPTION OF THE DRAWINGS

In order that the invention may be more fully understood an embodiment thereof will now be described by way of example, with reference to the accompanying drawings, in which.

DESCRIPTION OF THE PREFERRED EMBODIMENT

Figure 1:
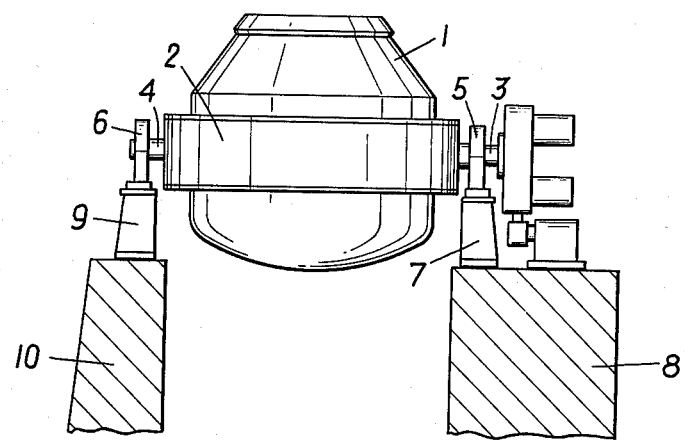
FIG. 1 shows a general view of a converter.
Figure 2:
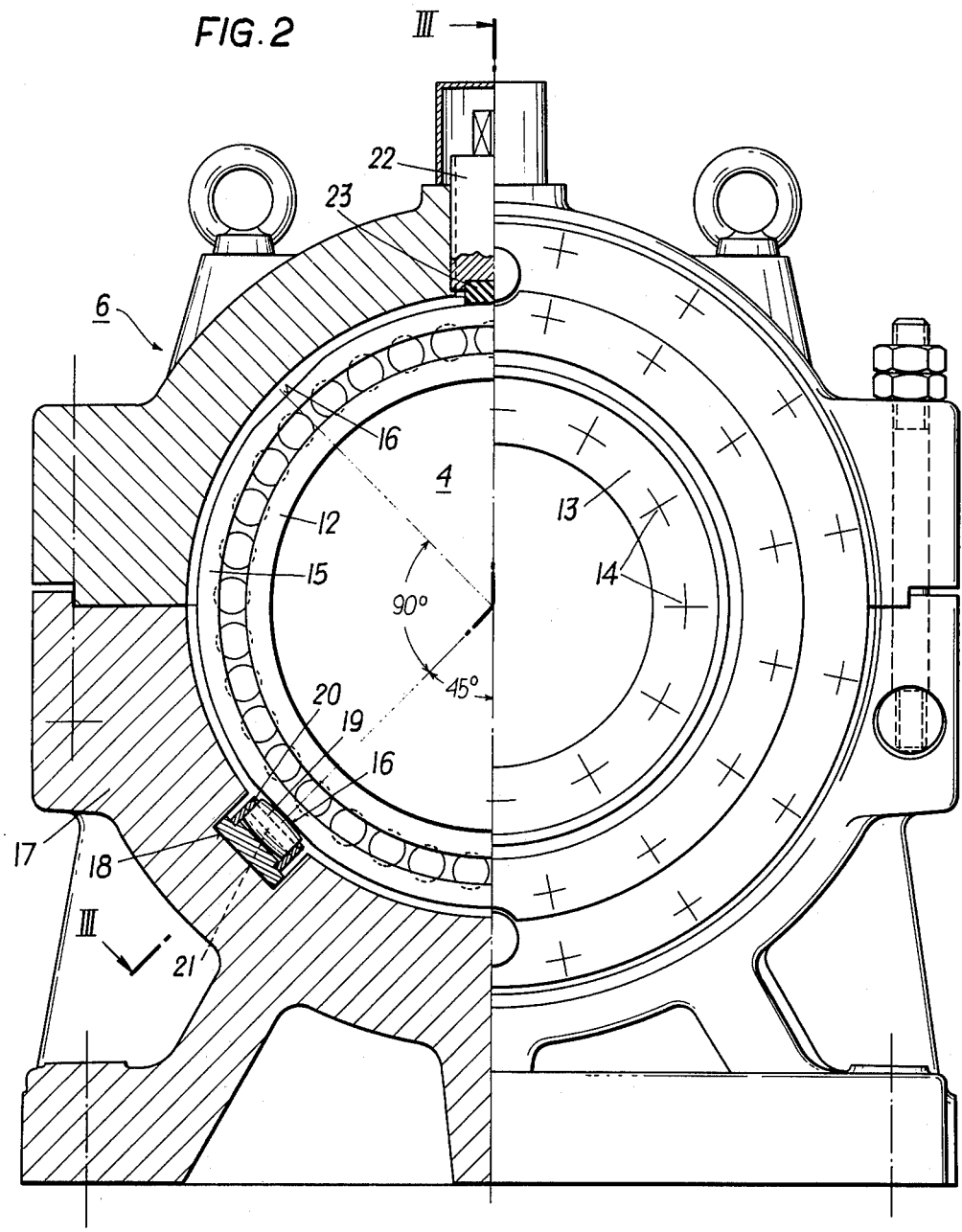
FIG. 2 shows the expansion bearing partly in section and partly in front view.
Figure 3:
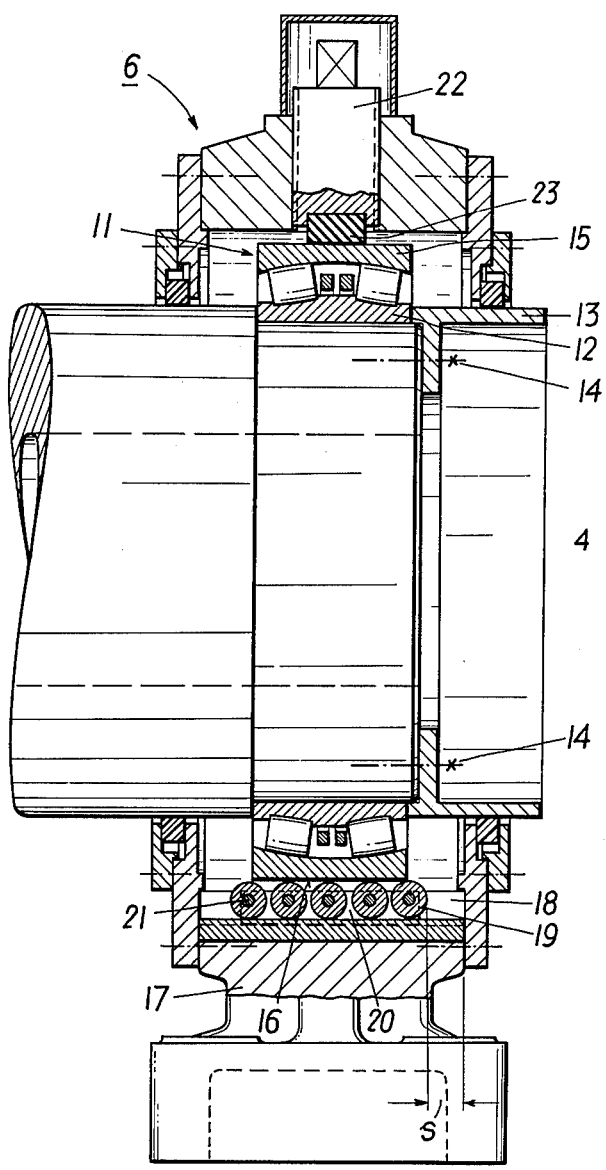
FIG. 3 shows a section of the expansion bearing according to line III—III of FIG. 2.

In FIG. 1 the converter is denoted with 1, the carrying ring with 2, the fixed bearing trunnion with 3, the expansion bearing trunnion with 4, the fixed bearing with 5 and the expansion bearing with 6. The fixed bearing 5 is connected via the fixed bearing stand 7 to the base 8 and the expansion bearing 6 is connected to the base 10 via the expansion bearing stand 9. According to FIG. 2 the bearing can have the form of a side, articulation, or ball and roller bearing, for instance a self-aligning roller bearing. Its inner race 12 is fixed on a carrying trunnion 4 by means of a bushing 13 and fixing screws 14. The outer race 15 of the bearing is flattened on four faces 16 distributed over the periphery of the race at 90° each. The outer race may be made of roller and ball bearing steel and may be hardened or quenched and tempered. In the lower part 17 of the expansion bearing housing 6, recesses 18 are provided opposite the flattened faces 16. In these recesses rollers 19 are mounted. As can be seen from FIG. 3 these rollers are united in a roller cage 20, in which the pins 21 which go through the rollers, are secured. The pins are arranged at such a distance from one another that the rollers can roll with play, so that rolling friction is always guaranteed. The possible axial path of displacement of the expansion bearing is referred to as $s$ in FIG. 3.

For reducing play in the bearing and for the accommodation of lateral forces (transverse to the trunnion axis) as they occur, for instance in skull pushing, according to another characteristic of the invention an adjustable threaded spindle 22 is provided on top of the bearing housing. This spindle presses against a platelet 23 of synthetic material or bronze. By appropriately actuating the spindle a statically defined three point bearing between the platelet and the rollers 19 in the recesses 18 is obtained. In this way a high stability of the bearing is achieved.

What we claim is:

1. An expansion bearing assembly for a converter carrying trunnion, which comprises:
   a bearing housing having a top and bottom and recesses distributed over its inner surface,
   an inner race secured in place on the trunnion,
   an axially displaceable outer race having flattened faces peripherally distributed over its outer surface and lying opposite the recesses of the bearing housing, and
   rollers arranged in the recesses and interacting with the flattened faces that form contact surfaces for the rollers.

2. An expansion bearing assembly as set forth in claim 1, wherein the expansion bearing is a slide bearing.

3. An expansion bearing assembly as set forth in claim 1, wherein the expansion bearing is an articulation bearing.

4. An expansion bearing assembly as set forth in claim 1, wherein the expansion bearing is a ball bearing.

5. An expansion bearing assembly as set forth in claim 1, wherein the expansion bearing is a roller bearing.

6. An expansion bearing assembly as set forth in claim 1, wherein the flattened faces are arranged at angles of 90° from each other, with respect to the axis of the trunnion.

7. An expansion bearing assembly as set forth in claim 1, wherein for accommodating forces transverse to the trunnion axis, an adjustable sliding plate is arranged on the part of the outer race adjacent the top of the bearing housing.

8. An expansion bearing assembly as set forth in claim 7, wherein the sliding plate is adjustable by means of a threaded spindle.

9. An expansion bearing assembly as set forth in claim 7, wherein the sliding plate is made of a synthetic material.

10. An expansion bearing assembly as set forth in claim 7, wherein the sliding plate is made of bronze.

11. An expansion bearing assembly as set forth in claim 1, further comprising a roller cage and pins in the recesses, the roller cage uniting a plurality of rollers arranged therein by means of the pins.

* * * * *

UNITED STATES PATENT AND TRADEMARK OFFICE
CERTIFICATE OF CORRECTION

PATENT NO. : 3,963,281
DATED : June 15, 1976
INVENTOR(S) : Ernst Riegler and Manfred Schmidt It is certified that error appears in the above-identified patent and that said Letters Patent are hereby corrected as shown below:

Directly below "U.S. Patent [19]", "Reigler et al." should read --Riegler et al.--;

Col. 2, line 16, "side" should read --slide--.

Signed and Sealed this

Thirty-first Day of May 1977

[SEAL]

Attest:

RUTH C. MASON
*Attesting Officer*

C. MARSHALL DANN
*Commissioner of Patents and Trademarks*